June 23, 1959  H. R. MALLORY  2,892,132
ELECTRICAL CONTROL CIRCUIT
Filed Aug. 23, 1955  4 Sheets-Sheet 1

INVENTOR
Henry Rogers Mallory
BY
ATTORNEY

June 23, 1959  H. R. MALLORY  2,892,132
ELECTRICAL CONTROL CIRCUIT
Filed Aug. 23, 1955  4 Sheets-Sheet 2

INVENTOR
Henry Rogers Mallory
BY
ATTORNEY

June 23, 1959

H. R. MALLORY 2,892,132

ELECTRICAL CONTROL CIRCUIT

Filed Aug. 23, 1955

INVENTOR
Henry Rogers Mallory
BY
ATTORNEY

# United States Patent Office 2,892,132
Patented June 23, 1959

2,892,132

ELECTRICAL CONTROL CIRCUIT

Henry Rogers Mallory, Rockridge North, Conn.

Application August 23, 1955, Serial No. 530,049

3 Claims. (Cl. 317—137)

This invention relates to electrical lighting control systems and is particularly directed toward such systems including a simplified system for the control of primary branch electrical circuits for lighting and power purposes in homes, business establishments and industry.

It is a feature of the present system that, by proper transformer and relay design, all of the control circuit wiring is accomplished at a low voltage below that with which electrical codes have jurisdiction. The control circuit wiring can be of the "open wiring" type, of a conductor size determined principally by mechanical consideration as the control function is primarily momentary, and of a current requirement below that which the smallest size conductor of proper mechanical properties can adequately handle. Branch circuit wiring in accordance with this invention, therefore, permits substantial economies, as contrasted with the more conventional full voltage control system used so generally in the past.

As an example, the National Electric Code and the electrical codes of most all municipalities require a minimum conductor size of #14 B and S gauge for all full voltage branch circuit control wiring, regardless of their intended use. Furthermore, the types of wire used must meet certain minimum standards in regard to insulation, protection against mechanical abrasion and damage, and installation. Metal encasement of all full voltage branch circuit control wiring is a requirement of many electrical codes, necessitating the use of rigid conductor, so called "BX," flexible conduit in these instances.

The low voltage control wiring covered by this invention can readily be accomplished with so called "bell wire" or "annunciator wire" or by plastic insulated wire of a size as small as #22 or #24 B and S gauge, with resultant substantial economies. Furthermore, the open control wiring can be much more readily installed in walls or partitions, between studs, rafters, etc., because of its small diameter. Stapling of the control wires directly to wood studs or rafters and plastering directly over the wires is common practice.

Since the branch circuit control system covered by the present novel invention functions on a momentary basis, any number of control switches or power circuit relays may be directly connected in parallel, permitting an extremely versatile and flexible control system at little additional expense. In contradistinction, similar versatility and flexibility with the more conventional full voltage control system requires the use of so called "three way" and "four way" control switches, with proportionally more #14 gauge or larger conductors to meet electrical code specifications. Furthermore, momentary operation of the control system covered by this invention permits the installation of one or more strategically located "master control switches" or "selective control switches" at a relatively small additional expense.

The branch circuit control system covered by this invention differs from the conventional full voltage control system in many ways and offers control versatility and flexibility at a saving in installed cost in the following manner:

(1) Relay or relays are located in the full voltage wiring circuit at or near the device to be controlled and are of such design that the full voltage switching contacts are located within the metal box required by the electrical codes, whereas the control coil, associated control equipment, switches, wiring, etc., are located outside the metal box and are operated at a low voltage not covered by requirements of the electrical codes.

(2) As the control function is accomplished by the momentary application of power to the control relay and as the current requirements of the control circuit are relatively small compared with the circuit to be controlled, small gauge wires or conductors can be used. "Open wiring" can be used because the voltage of the control circuit is below the minimum covered by the electrical codes.

(3) Control switches and relays may be directly paralleled in any combinations and in any quantity because of the momentary operation feature of the control system.

(4) Selective or master control switches may be readily connected into the system at a nominal additional cost because of the momentary operation feature and because "open" small gauge wiring can be used.

Applicant is aware of the fact that low voltage relay control systems somewhat similar in nature to the system covered by the present invention have been available commercially for several years. These, however, cannot be said to be constructionally the same nor to function in a manner like that of applicant's unique invention. For example, one of these is a two-wire control system employing "ratchet" or "impulse" type relays, which alternately connects and disconnects the power circuit upon momentary operation of a simple, basic type, normally open, momentary switch. Indication of the position of the power relay (whether it is "on" or "off") is not provided at the point of switching without recourse to pilot lights and additional transformers and wiring. For the purpose of this disclosure, it can be said that this system does not provide "remote sensing." A second control system employing three wires and using "rocker" or pivoted type single pole, double throw, normally open, momentary switches does provide remote sensing by virtue of a projection or some other distinguishing mark integral with the "rocker" or push button.

It is therefore an object of the present invention to provide a low voltage control system which satisfies the following desirable requirements and aims:

(1) Lowest possible installed cost;
(2) Remote sensing so that the switch operator can predetermine if he has turned the circuit "on" or "off."
(3) Maximum control circuit flexibility and versatility with the minimum accessories.

The present invention satisfies the above objectives in that it provides a basic two-wire control system with remote sensing and with flexibility and versatility advantages which will become self evident as the disclosure proceeds.

For a better understanding of the present invention, together with other and further objects, advantages and capabilities thereof, reference is made to the following description of the accompanying drawings. It is to be further noted that the drawings have been prepared in such a way that the full voltage part of the circuit and wiring which must conform to electrical codes is shown within metal enclosures and in "BX" conduit. All of the wiring outside of the metal enclosures is at a low voltage (usually 24 volts or less), which is outside of the jurisdiction of the electrical codes, and can be strung in the open in small gauge conductor.

It is apparent that in a control system of the type covered by this invention, wherein flexibility and versatility are among the principal advantages of the system, the system may be readily and economically adapted to the specific requirements of a home or business establishment. There are, therefore, quite obviously a great number of different combinations of control switches, power relays, master switches, selective switches, etc., which may be connected together to obtain the required control results. Thus, the scope of the invention is deemed to be accorded its widest possible application, as determined by the claims read in conjunction with the description herein.

Figure 1:
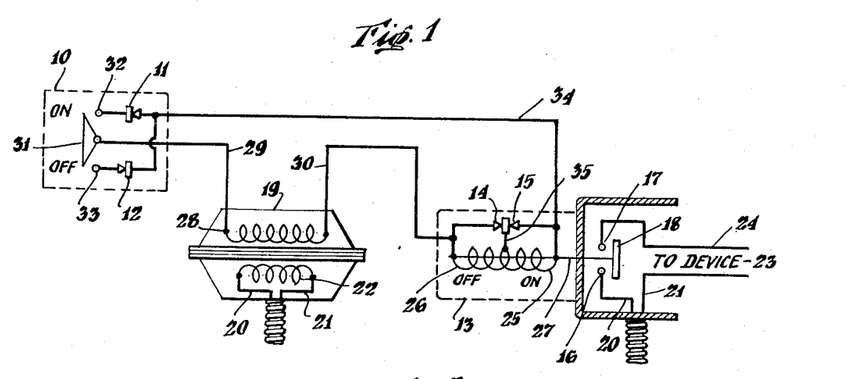
Fig. 1 is a circuit schematic of the basic control system with remote sensing and only two conductors or wires joining the control switch, power relay and transformer. A two-coil power relay is shown in this figure.

Referring now specifically to Fig. 1, it will be observed that the major components of the basic control system covered by this invention are a momentary type, single-pole, double-throw, control switch 10, with polarizing rectifying elements 11 and 12, a two-coil power relay 13, with polarizing rectifying elements 14 and 15 controlling the full voltage power circuit through contacts 16 and 17, in junction with bridging contact 18 and voltage step-down control transformer 19. Specifically, the fully supply voltage as represented by wire 20 and 21 is fed to the primary 22 of control transformer 19 and to the device 23 to be controlled through contacts 16 and 17, bridging contact 18 and wire 24. Power relay 13 is a two-coil relay of a type which remains in the position determined by which of the two coils (25 for "on" or 26 for "off") has been previously energized momentarily. If relay "on" coil 25 is energized (momentarily or otherwise) relay plunger 27 will be moved to the left closing bridging contact 18 on contacts 16 and 17, thereby closing the power circuit of wires 20 and 24 to device 23. Bridging contact 18 will remain in contact with contacts 16 and 17, connecting device 23 to the power source 20 and 21, until such a time as relay "off" coil 26 is energized (momentarily or otherwise), at which time relay plunger 27 will move to the right opening of the circuit of wires 20 and 24 to device 23 by bridging contact 18, separating from contacts 16 and 17, as shown.

The low voltage, secondary winding 28 of control transformer 19 supplies power to the control circuit through wires 29 and 30. Wire 29 connects to the center pole or rocker contact 31 of switch 10. Wire 30 is connected to power relay "off" coil 26 and polarizing rectifying element 14. Power relay "off" coil 26 is connected in series with power relay "on" coil 25 and to wire 34 to control switch polarizing rectifying elements 11 and 12 to control switch contacts 32 and 33. Power relay polarizing rectifying elements 14 and 15 are connected in opposing relationship, as shown, with the center terminal connected to the center terminal of the two relay coils 25 and 26 through wire 35 and the two outside rectifying element terminals connected to the two outside connections of the series power relay coils 25 and 26.

When the rocker contact 31 of control switch 10 is depressed at the top or "on" position the low voltage control circuit is completed from transformer secondary winding 19 through wire 30 to power relay 13, energizing "on"

coil 25 only, as polarizing rectifying element 15 across coil 25 is in the blocking or high resistance direction, whereas "off" coil 26 is shorted or bypassed by polarizing rectifying element 14 being in the forward or low resistance direction, then through wire 34 to control switch 5 polarizing rectifying element found in the forward direction, through contact 32 which is closed, to rocker contact 31, through wire 29, and then back to the other end of transformer secondary winding 19.

When the rocker contact 31 is depressed at the bottom or "off" position, the low voltage control circuit is completed in the opposite manner: from transformer secondary winding 28, through wire 29, through rocker contact 31, to contact 33, through polarizing rectifying element 12, to wire 34, through bypassed "on" coil 25 which is shunted by conducting polarizing rectifying element 15, to "off" coil 26 which is shunted by blocking polarizing rectifying element 14, to wire 30, and back to transformer secondary winding 28.

Polarizing rectifying elements 11, 12, 14 and 15 thereby provide these two wire control systems with "remote sensing," namely, the proper determination of the required relay operation ("on" or "off") from a point remote (frequently out of sight and hearing) from the control switch. Most any type of polarizing rectifying element can be used, provided it is reasonably conductive in the forward direction and capable of blocking the inverse peak voltage of the low voltage control circuit. Metallic rectifying elements of the selenium type and of relatively small area have been successfully used. In fact, it has been found that the center hole punchings, which are normally scrapped from the production of larger size, round, square or rectangular selenium cells, operate very successfully in this circuit. At the control circuit is momentary in operation and as small area rectifying element punchings can be used successfully, the polarizing rectifying elements can be readily incorporated within the control switch and power relay housings, as shown by the dotted lines of the drawings.

Figures 2, 3:
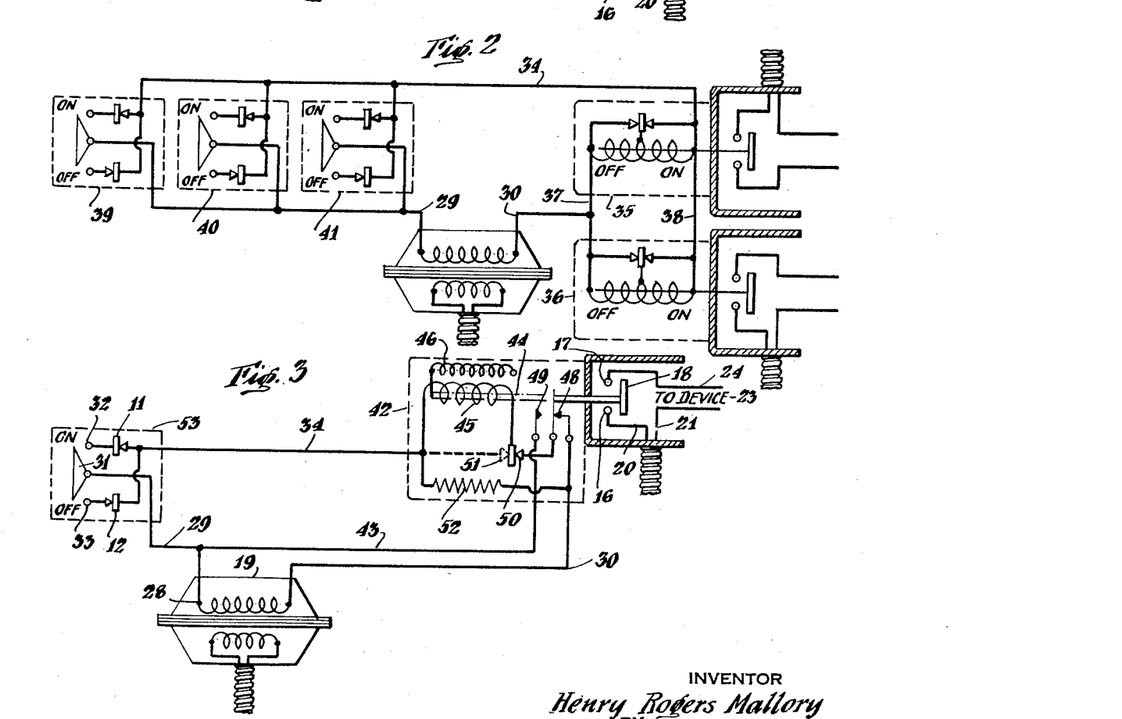
Fig. 2 is a circuit schematic of a more involved control system using three control switches, two two-coil power relays and a transformer. This figure shows the direct paralleling of the control switches and power relays, possible because of the momentary operation of this control system.
Fig. 3 is a circuit schematic of essentially the same basic control system as shown in Fig. 1, but differing therefrom in that it uses a more or less conventional single-coil type of power relay in a self-sealing type of circuit. In this circuit two wires are required for the control switches and three wires for the power relay, the third wire being the transformer return wire to keep the relay sealed closed after the relay has been energized by the "on" button.

Fig. 2 is illustrative of the flexibility and versatility of the control system covered by the subject invention. The circuit shown in Fig. 2 operates substantially as does the circuit described above in Fig. 1. The two power relays 35 and 36 are similar in construction and operation to power relay 13, described in detail supra. The control circuits of power relays 35 and 36 are directly paralleled by wires 37 and 38, which connect to wires 30 and 34, respectively (refer to Fig. 1). It is to be noted further that the full voltage controlled power circuit of relays 35 and 36 may be connected in several different ways to one or more devices, such as: (1) with the inputs directly paralleled and operating from the same phase and supply of the full voltage power source and with the outputs either directly paralleled and operating one device of large power requirements; or (2) with the outputs separately connected to two or more devices; or (3) with the inputs separately connected to a different wire (D-115-230 three-wire, single phase service) or different phases of the full voltage power source and with the outputs separately connected to two or more devices.

A typical example of a practical requirement for two or more power relays with the control circuits parallel-connected is in the control of a large bank of fluorescent or incandescent lights in an office, factory or business establishment, in which the total power requirements are more than those which can be handled by one relay and in which it may be desirable to split the load between the two sides of a three-wire, single phase power source or between the phases of a poly-phase power source.

Three parallel-connected control switches 39, 40 and 41 are shown as a typical example in Fig. 2. Switches 39, 40 and 41 are constructed and operate in the same fashion as control switch 10, described in detail in Fig. 1 above, and are all three connected in parallel to wires 34 and 29. Since the basis of operation of the control system covered by this invention is momentary, the power circuit or circuits controlled by power relays 35 and 36 may be either turned "on" or turned "off" by properly depressing or otherwise actuating any of the three control switches 39, 40 or 41. For example, the power relays 35 and 36 may be turned "on" by properly operating switch 39 and turned "off" by properly operating switch 40 or 41, or vice versa, in a manner identical to that described above for Fig. 1. From what has just been described, it should be obvious that almost any combination of control switches or power relays can be directly parallel-connected to form a versatile or flexible control system.

Fig. 3 is a circuit schematic of the same basic system as covered in detail in Fig. 1 above, except that in this circuit a different type of power relay 42 is shown requiring a third control wire 43 connected to wire 29 of control transformer 19—secondary 28. Power relay 42 is more or less of the conventional type, in which an armature or plunger 44 is attracted toward the coil 45 when coil 45 is energized, but is returned to a normal position away from the coil 45 by the action of spring 46 when coil 45 is de-energized. When coil 45 is energized and plunger 44 is attracted toward coil 45, the full voltage power circuit is completed to device 23 by bridging contact 18, making contact with contacts 16 and 17 from wires 20 and 21, in the same manner as described in Fig. 1 above. Coupled to plunger 44 is another set of contacts 47, 48 and 49. A circuit is completed between contacts 47 and 48 when coil 45 is de-energized and another circuitt is completed through contacts 47 and 49 when coil 45 is energized. Polarizing rectifier elements 50 and 51, together with relay sealing resistor 52, complete the components associated with relay 42. Control switch 53 is identical in construction and operation to control switches 10, 39, 40 and 41.

This particular embodiment of the control circuit covered by the present invention, as shown in Fig. 3, operates in the following manner. When the rocker contact 31 of control switch 53 is depressed at the top or "on" position the low voltage control circuit is completed from transformer secondary winding 19, through wire 30, to power relay 42, through contacts 47 and 48, through polarizing rectifier element 50, which is associated in the circuit in the low resistance or conducting direction, energizing relay coil 45, through wire 34, polarizing rectifier element 11, contacts 31 and 32 and wire 29, back to the other end of transformer secondary winding 19. Polarizing rectifier element 51, in shunt with relay coil 45, is in the high resistance or blocking direction, thereby permitting coil 45 to be energized and plunger 44 to be attracted toward coil 45, closing the full voltage circuit to device 23 through contacts 16, 17 and 18.

As plunger 44 is attracted toward coil 45, contact arm 47 opens the circuit to contact 48 and closes the circuit to contact 49. Relay coil 45 remains energized by a circuit from control transformer secondary winding 19, through wire 43, contacts 47 and 49, polarizing rectifier element 50, relay coil 45, sealing resistor 52, and wire 30, back to transformer secondary winding 19. Control switch 53 no longer needs to be depressed at the top or "on" position in order that relay 42 may continue to be energized, closing the full voltage circuit to device 23 as relay 45 is in what is commonly referred to as a "sealed" or "self-sealing" position, as described above. During the reverse cycle of the alternating current power source polarizing rectifier element 50 will be found to be in the high resistance or blocking direction and rectifier element 51 in the low resistance or forward direction, applying a "slugging" action on relay coil 45. If power relay 42 is properly designed with either a short circuited "slug" or separate winding or section of the main winding, or properly damped or otherwise designed for operation on alternating current, rectifier element 51 may not be a required component of this power relay 42, and, for this reason, rectifier element 51 is shown in dotted lines. Obviously, a capacitor could be substituted for rectifier element 51 to "slug" or hold in power relay 42 during the blocking half cycle of polarizing rectifier element 50.

With power relay 42 "sealed" in, as described above, control switch 53 may be depressed at the top or "on" position at any time without releasing or de-energizing power relay 42, as such operation of control switch 53 merely imposes a slight additional load on control transformer 19 through sealing resistor 52 during that part of the alternating current cycle when polarizing rectifier element 50 is normally blocking and when the "slugging" action of rectifier element 51, or other means as described directly above, is keeping plunger 44 attracted toward relay coil 45.

Depressing control switch 53 at the bottom or "off" position, however, de-energizes relay coil 45 and releases power relay 42, since a bypass or shunting circuit to relay coil 45 is completed from relay coil 45, through wire 34, polarizing rectifier element 12, contacts 31 and 33, wires 29 and 43, contacts 47 and 49, polarizing rectifier element 50, back to relay coil 45. Such operation of control switch 53 also acts as a bypass for control transformer 19, through sealing resistor 52, during that part of the alternating current cycle which normally supplies power or energy to relay coil 45 to keep it "sealed" in. Similarly, subsequent depressing of control switch 53 at the bottom or "off" position, with power relay 42 in the de-energized or "off" position, will not energize or turn "on" power relay 42 because polarizing rectifier element 50 is in the high resistance or blocking direction to the flow of any current which may flow through polarizing rectifier element 12 when contacts 31 and 33 are made and when the alternating current cycle is such that polarizing rectifier element 12 is in the low resistance or forward direction. Under these conditions, polarizing rectifier elements 12 and 50 are connected back-to-back or in opposition, and little or no current will flow from control transformer 19.

Sealing resistor 52 serves two purposes. One is to act as a high resistance path when control switch 53 is depressed at the top or "on" position, permitting current to flow through contacts 45 and 47, polarizing rectifier element 50 and relay coil 45, thereby energizing power relay 42, as explained above. The other purpose is to reduce the power drawn from control transformer 19 by power relay 42 when it is in "sealed" or "self-sealed" operation, as covered above. It should be noted that essentially the full voltage of the secondary winding 28 of control transformer 19 is applied to power relay coil 45 (less the voltage drop of the wiring and forward drop resistance of polarizing rectifier elements 11 and 50) when control switch 53 is depressed at the top or "on" position, supplying full pulling power or attraction to power relay 42; but that as soon as plunger or armature 44 has moved sufficiently to transfer the closed circuit from contacts 47 and 48 to 47 and 49, the voltage across and power consumed by relay coil 45 is reduced by the inclusion of sealing resistor 52 into the circuit to a value sufficient only to keep power relay 42 energized or "sealed." This represents a substantial power saving and permits either the use of a control transformer of smaller rating and lower cost, or the use of more power relays operating from the same control transformer. Furthermore, power relay 42 can be of lower cost and of smaller size because of the reduced wattage and heating in relay coil 45 during the extended "sealing" or "self-sealing" period.

Figure 4:
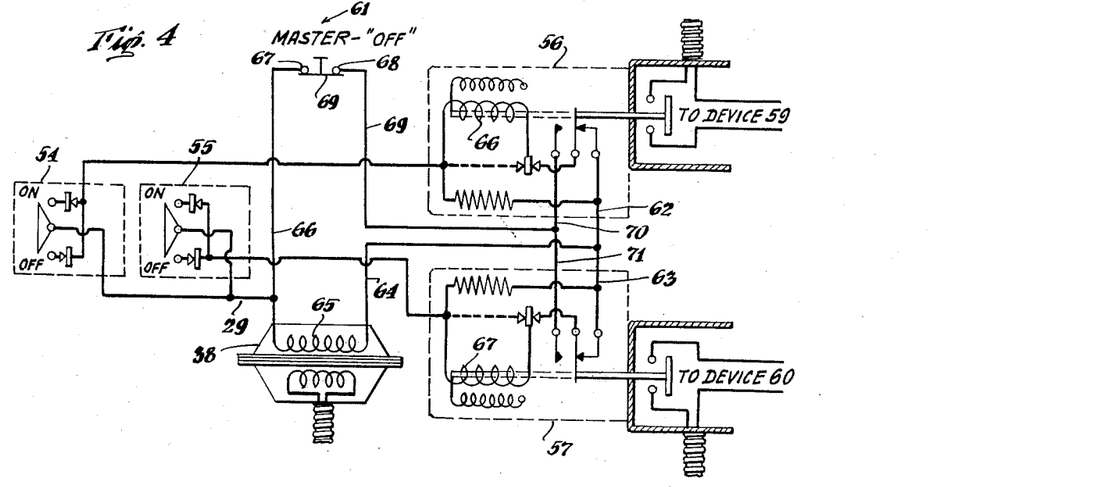
Fig. 4 is a circuit schematic of a more involved control system using power relays of the type shown in Fig. 3. Two independent circuits are shown operating from a common transformer. A normally closed single-pole, single throw, momentary push button switch is shown in the transformer return-relay sealing circuit which may be used as a "master off" button to break the self-sealing circuit of any number of power relays connected through this switch.

In Fig. 4 the control system as covered specifically in Fig. 3 has been amplified to show the use of two control switches 54 and 55, which are identical in construction and operation to control switch 10, as described in detail in Fig. 1, and two power relays of the three-wire type 56 and 57, identical in construction and operation to power relay 46, as described directly above in Fig. 3. Two independent control circuits are shown in Fig. 4, operating from a common control transformer 58. Control switch 54 operates power relay 56 and controls device 59 independently of control switch 55, which operates power relay 57, controlling device 60. The method by which each control circuit operates is identical to that described above in Fig. 3 and thus does not need to be repeated in detail in this description. Momentary type, normally closed, master "off" switch 61 is included to describe a versatility feature of the three control wire power relay system, as covered in detail in Fig. 3 above. Since power relays 56 and 57 are of the "sealed" or "self-sealed" type, momentarily breaking or opening of the sealing circuit to the common control transformer 58 will "unseal" or de-energize any power relay connected through momentary type, normally closed, master "off" switch 61.

In Fig. 4, control transformer return wires 62 and 63 of power relays 56 and 57 are connected together to wire 64, to secondary winding 65 of control transformer 58. The other end of secondary winding 65 is connected to wire 29, which feeds control switches 54 and 55, and is also connected to wire 66 through normally closed contacts 67, 68 and 69 of the momentary type, normally closed, master "off" control relay 61, to wire 69, to the other control transformer return wires 70 and 71 of power relays 56 and 57. With master "off" control switch 61 in the normal or unused position, the transformer secondary voltage is applied to the control transformer return wires 62, 63, 70 and 71 of power relays 56 and 57 (corresponding to control transformer return wires 30 and 43 of power relay 42 in Fig. 3) and these power relays 56 and 57 may be energized or de-energized (operated "on" or "off") independently of each other by operating their respective control switches 54 and 55.

Momentarily pushing or operating master "off" control switch 61 separates contact 69 from contacts 67 and 68, interrupting the circuit of wires 66 and 69 between control transformer return wires 70 and 71 and control transformer secondary winding 65, thereby de-energizing relay coil 66 and/or 67 of power relays 56 and 57 (corresponding to relay coil 45 of power relay 42 in Fig. 3), depending upon whether power relay 56 and/or 57 had been previously energized by their respective control switches 54 and 55.

A master "off" control switch in a branch circuit control system, as used in a home or business establishment, is frequently a very desirable feature or accessory, especially if it can be accomplished at reasonable cost, as it permits, for instance, "turning off" all branch circuits connected through the master "off" control switch in the bedroom before going to bed or at the entrance door of a business establishment, as typical examples. One or more momentary type, normally closed, master "off" control switches can be included in the control transformer return circuit between wires 66 and 69, if desired, and these master "off" control switches can be located at several strategic locations, such as in the bedroom and garage, or inside the front door of a home. The master "off" control switch or switches can be connected in series, with wire 64 in control transformer return circuit from wires 62 and 63, in addition to, or in lieu of, between wires 66 and 69, as shown in Fig. 4. The inclusion of one or more master "off" control switches in no way affects or detracts from the normal operation of the independent control circuits.

Figure 5:
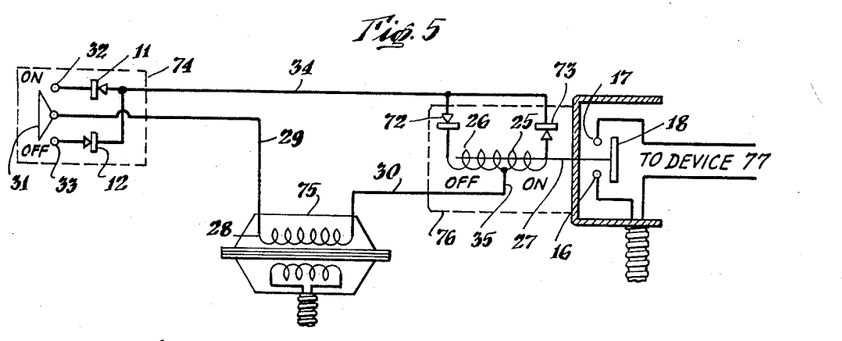
Fig. 5 is a circuit schematic of still another basic control system using two wires joining the control switch, power relay and transformer. This circuit differs from the one shown in Fig. 1 in the method of connecting the polarizing rectifiers to the two-coil power relay.

Fig. 5 is a circuit schematic of the same basic system as described in detail above for Fig. 1, with the distinguishing feature of the polarizing rectifier elements 72 and 73 connecting into the circuit in a slightly different manner, to polarizing rectifier elements 14 and 15 of Fig. 1. Control switch 74, control transformer 75 and power relay 76, including the full voltage contact system, armature or plunger and coils, are constructed and operate in a manner substantially identical to the system discussed in detail in Fig. 1. When control switch 74 is depressed at the top or "on" position, the low voltage control circuit is completed from transformer secondary winding 19 of control transformer 75, through wire 30, to the common connection represented by wire 35 of the two relay coils 25 and 26, through polarizing rectifier element 73 in the low resistance or forward direction, wire 34, polarizing rectifier element 11 in the low resistance or forward direction, through contact 32 closed to rocker contact 31, through wire 29, and back to the other end of transformer secondary winding 28 of control transformer 75. Under the conditions outlined directly above, polarizing rectifier element 72 will be found in the high resistance or blocking direction, thereby preventing any appreciable current flow through relay coil 26. As relay coil 25 only is energized, plunger or armature 27 will be attracted or moved in the direction of the relay coils, closing bridging contact 18 on contacts 16 and 17, thereby closing the full voltage power circuit to device 77, as has been discussed previously in Fig. 1.

When control switch 74 is depressed at the bottom or "off" position, the low voltage control circuit is completed from transformer secondary winding 28 of control transformer 75, through wire 29, closed contacts 31 and 33, polarizing rectifier element 12 in the low resistance or forward direction, wire 34, polarizing rectifier element 72 in the low resistance or forward direction, relay coil 26, wires 35 and 30, and back to the other end of transformer secondary winding 28 of control transformer 75. Polarizing rectifier element 73 will be found to be in the high resistance or blocking direction, thereby preventing the flow of a significant current through relay coil 25. Plunger or armature 27 will be moved away from the relay coils by relay coil 26 only being energized, thereby opening the full voltage power circuit to device 77, as described in detail in Fig. 1. Although there may appear to be little preference in regard to the power relay polarizing rectifier element combinations described in Figs. 1 and 5, the Fig. 1 combination might be preferred because of the "slugging" action of the polarizing rectifier element on the relay coil, which is not being energized by the control switch under any one given operation of the system.

Figures 6, 7:
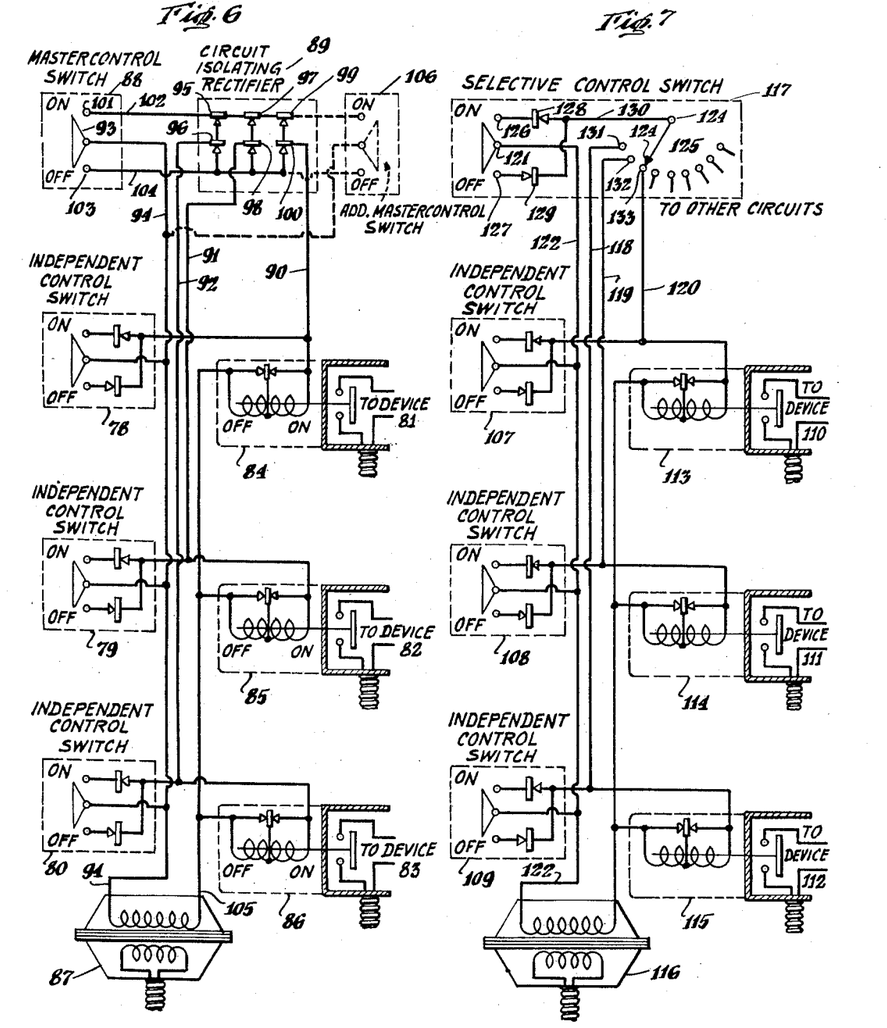
Fig. 6 is a circuit schematic of a more involved control system of the same type as shown basically in Fig. 1 and Fig. 2, in which three independent control circuits are operated from a common transformer (the usual practice is to use one common transformer for a home or small business establishment). Also shown are circuit isolating rectifiers and one or more master "on" and "off" switches, whereby a given number of independent circuits may be connected simultaneously thereto by isolating rectifiers. Only one wire is required to the isolating rectifiers from each independent circuit to be controlled and three wires are required to each master control switch (two to the isolating rectifiers and one to the transformer).
Fig. 7 is a circuit schematic of a more involved control system of the same basic type as shown in Fig. 1 and Fig. 6. Instead of a master "on" and "off" switch, a selective "on" and "off" switch is shown. Only one wire is required from each of the independent circuits to be controlled, and one to the transformer. The selective switch may be used to operate any independent circuit connected to it by setting the selective switch to the circuit to be controlled and then operating the control switch in the desired manner.

In Fig. 6 control switches 78, 79 and 80 independently control devices 81, 82 and 83, through power relays 84, 85 and 86, from control transformer 87, in a manner substantially similar to that previously discussed in detail in Fig. 1. Master control switch 88, in conjunction with circuit isolating rectifier 89, is connected to each of the independently controlled branch circuits to be controlled by the master control switch 88 by wires 90, 91 and 92. Rocker arm contact 93 of master control switch 88 is connected to one side of the secondary winding of transformer 87 by wire 94. Circuit isolating rectifier 89 consists of two rectifying elements for each independently controlled branch circuit to be controlled from the master switch 88, such as rectifying elements 95 and 96 associated with wire 92 to independently controlled branch circuit consisting of control switch 80 and power relay 86, rectifying elements 97 and 98 working with wire 91, control switch 79 and power relay 85, and rectifying elements 99 and 100 associated with wire 90, control switch 78 and power relay 84. Rectifying elements 95, 96, 97, 98, 99 and 100 are connected in proper polarization, as shown in Fig. 6, with one side, such as the alloy or positive side in the case of selenium elements, of 95, 97 and 99 connected together, and to contact 101 of master switch 88 through wire 102 and the other side, such as the metal base or negative side in the case of selenium, of 96, 98 and 100 connected together, and to contact 103 of master switch 88 through wire 104.

As explained previously and covered in detail in the explanation associated with Fig. 1, the three power relays 84, 85 and 86 may be independently and individually controlled by their respective independent control switches 78, 79 and 80, with no interaction between the three circuits. As an example, independent control switch 78 remotely operates and controls power relay 84, which in turn connects or disconnects device 81 from the power line, but has no effect or control over power relays 85 and 86 and associated devices 82 and 83. When master control switch 88 is operated, however, all three power relays 84, 85 and 86 are simultaneously operated or energized in accordance with either the "on" or "off" function which has been selected by the operator of master switch 88. For instance, if devices 81, 82 and 83 have been previously turned "on" by operation of their associated power relays 84, 85 and 86 through proper operation of their associated independent control switches 78, 79 and 80, depressing master control switch 88 at the bottom or "off" position will turn "off" simultaneously all three devices 81, 82 and 83. This is accomplished in the following manner. When master control switch 88 is depressed at the bottom or "off" position, the control circuit from the secondary of transformer 87 is completed through wire 94, rocker arm contact 93, stationary contact 103, wire 104, through rectifying elements 96, 98 and 100 in the forward or low resistance directon, to wires 92, 91 and 90 respectively, through the "off" windings or coils of power relays 86, 85 and 84 respectively, as covered in detail in Fig. 1, to wire 105 and back to the secondary of control transformer 87.

Depressing master control switch 88 at the top or "on" position will simultaneously turn "on" all three devices 81, 82 and 83 by completing the control circuit from the secondary winding of transformer 87 through wire 105, energizing the "on" coils of power relays 86, 85 and 84, as covered above in the discussion associated with Fig. 1, wires 92, 91 and 90, through rectifying elements 95, 97 and 99 in the forward or low resistance direction to wire 102, contact 101, rocker arm contact 93 and wire 94, back to the secondary winding of transformer 87.

Circuit isolating rectifiers 89 permit simultaneous operation of all independent branch circuits connected to it by actuation of the master switch also connected to it, but it also prevents any interaction between independent branch circuits so that none of the independent branch circuit control switches can operate as a master switch or operate a power relay not directly associated with the particular branch circuit control switch. A review of circuit isolating rectifier 89 will disclose that rectifying elements 95, 96, 97, 98, 99 and 100 are so connected with regard to the independent branch circuit control systems that a rectifying element is always found to be in the blocking or high resistance direction between wires 90, 91 and 92, connecting circuit isolating rectifier 89 with the three independent branch circuits. For example, if independent control switch 78 is depressed at the bottom or "off" position, control current flowing from control transformer 87 in wire 92, as explained in detail in the discussion associated with Fig. 1, will find rectifying elements 95, 98 and 100 in the forward or low resistance direction, but it will also find rectifying elements 96, 97 and 99 in the blocking or high resistance direction, thereby preventing any appreciable current flow from wire 92 to wires 91 or 90. Similarly, if independent control switch 78 is depressed at the top or "on" position, rectifying elements 96, 97 and 99 will be found to be in the forward direction, but rectifying elements 95, 98 and 100 will be in the blocking direction, again preventing any appreciable current flow from wire 92 to wires 91 and 90, thereby, isolating the independent branch circuit control systems.

Any number of master control switches may be placed directly in parallel to master control switch 88, operating from the same circuit isolating rectifier 89, such as additional master control switch 106, as is shown in dotted lines in Fig. 6. The method of operation of additional master control switch 106 is, of course, identical in every regard with the operation of master control switch 88, as described in detail above. If an elaborate control system layout requires master control switches that are widely separated, two or more isolating rectifiers may be used adjacent to their master control switches, if economics justify, without any interaction between independent branch circuits. Furthermore, the various master control switches need not necessarily provide simultaneous control for the same group of independent branch circuits operated from the same control transformer, if separate circuit isolating rectifiers are used, as any maser control switch will only operate those independent branch circuits connected to it through the circuit isolating rectifier associated with it.

One of the important features of this invention is the simplicity of the master control switch system, as described directly above. Only one wire is required between the circuit isolating rectifier and each of the independent branch circuits to be controlled by the master control switch. Although the master control switch itself requires three connections and three wires, two of them are to the circuit isolating rectifier, usually closely located, and the third wire is to the control transformer circuit which is as near, in most cases, as the nearest independent branch circuit control switch. Any given number of independent branch circuits may be simultaneously controlled by one or more master control switches that are connected through circuit isolating rectifiers, up to the power limitations of the control transformer and the wiring. Several different groupings of independent branch circuits may be controlled by several different master switches, in almost any combination required, through proper connection and use of isolating rectifiers without in any way interfering with the independent operation of the independent branch circuits. This flexibility and versatility is accomplished by circuit isolating rectifiers, without the necessity for any expensive multi-contact relays or motor operated switches.

The circuit shown in Fig. 7 is substantially similar to that shown in Fig. 6 in that independent control switches 107, 108 and 109 independently control devices 110, 111 and 112 by means of power relays 113, 114 and 115 from control transformer 116 in the same manner as that which has previously been described in detail in Fig. 1. Selective control switch 117 is connected to each of the independently controlled branch circuits to be controlled by the selective control switch 117, by wires 118, 119 and 120. Rocker arm contact 121 of selective control switch 117 is connected to one side of the secondary winding of control transformer 116 by wire 122. The movable or rotary arm contact 124 of selector switch 125 is connected to "on" contact 126 and "off" contact 127, through rectifying elements 128 and 129, respectively, by means of wire 130. Stationary contacts 131, 132 and 133 of selector switch 125 connect to wires 118, 119 and 120, and thence to the independent branch circuit control systems consisting of independent control switch 107, power relay 113, switch 108, relay 114 and switch 109, relay 115, respectively. Selective control switch 117 is identical in every respect to control switch 10, as described in detail in Fig. 1, and is identical to independent control switches 107, 108 and 109 in this Fig. 6, with the addition of selector switch 125, shown as but not necessarily limited to a rotary switch. The selector switch 125 is included solely for the purpose of providing branch circuit selection to the operation of selective control switch 117. The method of operation of selective control switch 117 should be obvious from the discussion associated with both Fig. 1 and Fig. 2, which latter figure covers the control of a single branch circuit by three paralleled control switches 39, 40 and 41, and which circuit is similar to the circuit shown in Fig. 6 when it is considered that selector switch 125 merely parallels selective control switch 117 across independent control switches 107, 108 or 109, one circuit at a time, depending upon the setting of rotary or movable arm contact 124. For instance, if rotary or movable arm contact 124 of selector switch 125 is contacting stationary contact 132, rocker arm contact 121 will turn "on" or "off" device 111, by means of power control relay 114 through wire 119, depending upon whether rocker arm contact 121 is closed to contact 126 for "on" or to contact 127 for "off."

Selective control switch 117 may be used as a master control switch by setting rotary or movable arm contact 124 in position to contact stationary contact 131, depressing rocker arm 121 at the top for "on" to close with contact 126, or at the bottom for "off" to close with contact 127, and while still depressed rotating selector switch 125 through it for a complete arc of rotation, subsequently closing rotary or movable arm 124 to stationary contacts 132 and 133, and to the other stationary contacts shown and marked "to other circuits."

Figure 8:
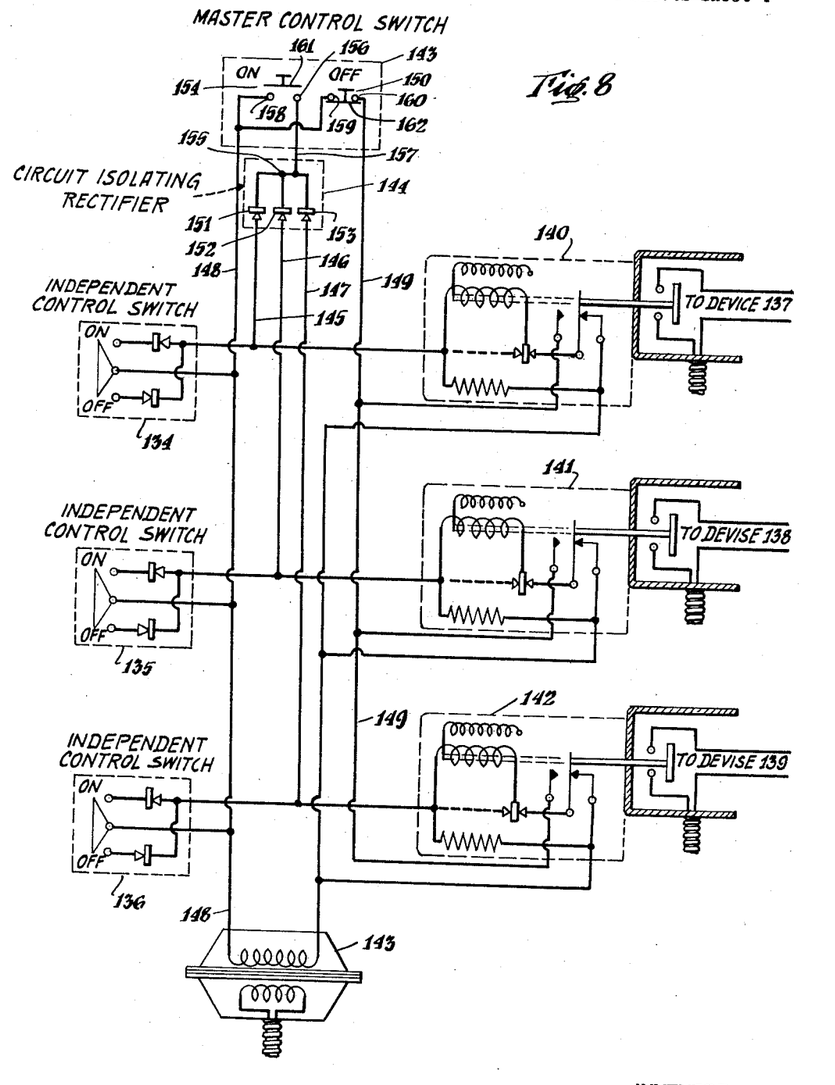
Fig. 8 is a circuit schematic of a more involved control system of the same basic type as shown in Figs. 3 and 4, in which three control circuits are independently controlled. In addition, a two-button momentary type "on-off" master control switch is used in conjunction with isolating rectifiers (for master "on" operation only) to control all three (or any given number of independent circuits which may be connected to it through isolating rectifiers) independent circuits simultaneously.

The circuit shown in Fig. 8 is a modification of the master control system as shown in Fig. 6 and as related only to the type of three-wire power relay covered in detail in Fig. 3 and Fig. 4, utilizing the simple, normally closed, momentary type, master "off" switch system that this type of three-wire "sealing" or "self-sealing" power relay permits, as described in detail in Fig. 4.

Independent control switches 134, 135 and 136 independently control devices 137, 138 and 139 by means of power relays 140, 141 and 142 from control transformer 143 in a manner identical to that which has been previously described in detail in Fig. 3. Master control switch 143, in conjunction with circuit isolating rectifier 144, is connected to each of the independently controlled branch circuits to be controlled by master control switch 143, by wires 145, 146 and 147, with wire 148 connecting to one side of the secondary winding of control transformer 143 and with the master "off" control switch wire 149 connecting into the power relay "sealing" circuit as represented by wires 69, 70 and 71 in Fig. 4. With the master "off" control switch 150 of the momentary, normally closed type, described in detail in Fig. 4 as items 61, 67, 68 and 69, and controlling the "sealing" circuit of the three-wire type of power relays 140, 141 and 142, circuit isolating rectifier 144 need only contain in this circuit as many rectifying elements as there are independent branch circuits to be master controlled, which is three in the case of Fig. 8. The three rectifying elements in circuit isolating rectifier 144 are represented as 151, 152 and 153, one end of each connected together in the proper polarization, as shown in Fig. 8, with the common connection 155 wired to master "on" control switch 154, stationary contact 156, through wire 157. The other stationary contact 158 of master "on" control switch 154 is connected to one side of the secondary winding of control transformer 143 by means of wire 148 and also to master "off" control switch 150, stationary contact 159, which is identical in connection and operation to 67 in Fig. 4. The other stationary contact 160 of master "off" control switch corresponds to 68 in Fig. 4 and connects through wire 149 to the normally open relay contacts of the "sealing" circuit of power relays 140, 141 and 142, which are analogous to wires 69, 70 and 71 in Fig. 4 and wire 43 and contact 49 in Fig. 3.

Circuit isolating rectifier 144, made up of the three rectifying elements 151, 152 and 153, isolates the three independent branch circuits in the same manner as described in Fig. 6 with regard to rectifying elements 95, 96, 97, 98, 99 and 100, but permits simultaneous operation or energization of power relays 140, 141 and 142 when master "on" control switch 154 is depressed. This completes the control circuit from one side of the secondary winding of control transformer 143, through power relays 140, 141 and 142, energizing and "sealing" the relay coils, as described in detail in the discussion related to Fig. 3, through wires 145, 146 and 147, rectifying elements 151, 152 and 153, wire 157, contact 156, bridging contact 161, contact 158, wire 148, back to the other side of secondary winding of control transformer 143. Depressing the master "off" control switch 150 momentarily breaks the power relay "sealing" circuit by bridging contact 162, interrupting the circuit between stationary contacts 159 and 160, thereby de-energizing any and all power relays connected through this normally closed, momentary type master "off" control switch 150, as covered in detail in the description accompanying Fig. 4, subsequently turning "off" the devices controlled by the power relays.

The three-wire type of power relays described in detail in Figs. 3 and 4 and as shown also in Fig. 8, can be master controlled by the identical type of master control switch and circuit isolating rectifiers as are shown in Fig. 6, and they can also be master controlled by the type of master control switch shown in Fig. 8. The Fig. 8 system is possibly more economical in that only half as many rectifying elements are required. The reduction in the number of rectifying elements, however, is offset by the need for an additional wire 149, in the case of the momentary, normally closed, master "off" control switch system. Two or more master control switches of the type shown in Fig. 8 can be used to master control the same or different groups of independent branch circuits, with the same or separate circuit isolating rectifiers, as covered in Fig. 6 above. The additional master control switches must be series-connected with regard to the master "off" control buttons, in the same manner as is common with regard to the "start-stop" or "on-off" two-push button control system practically universally used with magnetic or solenoid contactors, sometimes referred to as motor starters, etc. Since this series-connected, push-button system is so common and generally well understood, it is not considered necessary to describe its method of connection and operation herein.

Figure 9:
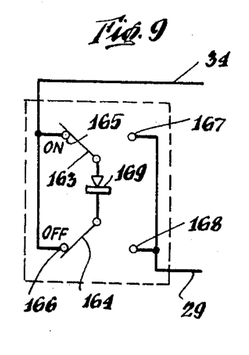
Fig. 9 is a circuit schematic of an alternate type of momentary "on-off" control switch utilizing but one polarizing rectifier which may be substituted in any of the previous schematic or independent circuit control switches.
Figure 10:
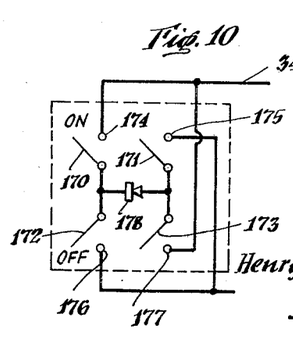
Fig. 10 is a circuit schematic of still another alternate type of momentary "on-off" control switch utilizing but one polarizing rectifier, which may be substituted in any any of the previous schematics as independent circuit control switches.

Figs. 9 and 10 are included to show alternate types of control switches incorporating one rectifying element instead of the two rectifying elements shown in the independent branch circuit control switches of all previous figures, such as, for instance, rectifying elements 11 and 12 in Figs. 1, 3 and 5. As the control system covered by this invention is momentary in operation, only one of the two rectifying elements, such as 11 and 12, in the control switches is used at any one time. It is practical, therefore, to utilize a switching system which will utilize one rectifying element to polarize the control system in one direction to turn "on" the device to be controlled, or to polarize the control system in the other direction to turn "off" the device.

The control switch shown in Fig. 9 utilizes two single pole, double throw, momentary type switches, represented by movable arm contacts 163 and 164, normally closed contacts 165 and 166, and normally open contacts 167 and 168. Mechanically the two SPST switches might be coupled to a center pivoted member or rocker which is spring loaded to return to its center or neutral position after being actuated. Rectifying element 169 is connected between the two movable arm contacts 163 and 164. Both of the normally closed contacts 165 and 166 are connected together and to a wire or terminal which is connected to the rest of the control system, such as wire 34 in Figs. 1, 3 and 5. The two normally open contacts 167 and 168 are similarly connected together to form the other connection to the rest of the circuit, such as wire 29 in Figs. 1, 3 and 5. If the "on" button or switch is depressed at the top, the control circuit will be completed from wire 29, to contact 167, to movable arm contact 163, through rectifying element in the forward or low resistance direction, to movable arm contact 164, to contact 166, to wire 34, and the rest of the control circuit. If the "off" button or switch is depressed at the bottom, the control circuit will be completed in the opposite direction from wire 34, to contact 165, to movable arm contact 163, through rectifying element 169 in the forward or low resistance direction, to movable arm contact 164, to contact 168, to line 29, and the rest of the control circuit. With both buttons or switches in the neutral position (neither depressed), the circuit is incomplete between wires 29 and 34, as shown. This control switch system, therefore, satisfies the control switching requirement of being open in the neutral position, polarizing the control circuit in one direction when the "on" button is depressed, and polarizing it in the other direction when the "off" button is depressed.

The control switch shown in Fig. 10 utilizes two double pole, single throw, normally open, momentary type switches, represented by movable arm contacts 170, 171, 172 and 173, and normally open contacts 174, 175, 176 and 177. Mechanically the two DPST normally open switches should be coupled to a center pivoted member or rocker which is spring loaded to return to its center or neutral position after being actuated in order that the two lines connecting the control switch to the rest of the control circuit, as represented by wires 29 and 34 and as shown in Figs. 1, 3 and 5, are not directly connected together if both the "on" and "off" buttons or switches are depressed simultaneously, which would be a possibility in the absence of a center pivoted member or rocker. The two movable arm contacts 170 and 171 associated with the "on" switch are connected to the two movable arm contacts 172 and 173 associated with the "off" switch, with rectifying element 178 connected between the wires joining the two pairs of movable contact arms. Normally open contacts 174 from the "on" switch and 177 from the "off" switch are connected to the terminal or wire connecting the control switch with the rest of the control circuit, represented by wire 34 from Figs. 1, 3 and 5. Similarly, normally open contacts 175 from the "on" switch and 176 from the "off" switch are connected to the other terminal or wire connecting the control switch with the rest of the control circuit represented by wire 29 from Figs. 1, 3 and 5. If the "on" button or switch is depressed, the control circuit will be completed from wire 29, to contact 175, to movable arm contact 171, through rectifying element 178 in the forward or low resistance direction, to movable arm contact 170, to contact 174, to wire 34, and to the rest of the control circuit. If the "off" button or switch is depressed, the control circuit will be completed from wire 34, to contact 177, to movable arm contact 173, through rectifying element 178 in the forward or low resistance direction, to movable arm contact 172, to contact 176, to wire 29, and to the rest of the control circuit. With both buttons or switches in the neutral position (neither depressed), the circuit is incomplete between wires 29 and 34, as shown. As in Fig. 9 above, this control switch system satisfies the requirement of being open in the neutral position, polarizing the control circuit in one direction when the "on" button is depressed and polarizing it in the other direction when the "off" button is depressed.

Any one or combination of the three types of independent branch circuit control switches, as described in detail in Fig. 1, Fig. 9 or Fig. 10, can be used interchangeably with any of the circuits covered by this invention.

By the description of the several figures hereabove, I have provided among other things several features as follows:

(1) A control system in which "on" and "off" control is accomplished with only two wires, and which provides remote "sensing," that is, depressing a rocker or center pivoted member at the top for "on" or at the bottom for "off."

(2) A control system providing remote "on" and "off"

sensing through the utilization of polarizing, rectifying elements at the control switch and at the remotely located device to be controlled. The system thus allows individual polarizing, rectifying elements to act on: (a) the top half of the A.C. wave to turn "on" the device, and (b) the bottom half to turn "off" the device.

(3) A control switch incorporating polarizing rectifying elements for remote sensing control over two wires, as distinguished from the cumbersome systems heretofore used.

(4) A power relay which includes polarizing, rectifying elements therein for remote sensing control, in conjunction with a two-wire sensing type control switch.

(5) A power relay for a remote sensing type momentary control system utilizing a two-wire sensing type of control switch in which the relay is held in or "sealed" by an auxiliary set of contacts after the relay has been momentarily energized, which relay may be readily de-energized by momentarily breaking the "sealing" circuit.

(6) A novel wiring assembly of the "sealing" type of power relay. In this assembly the auxiliary contacts transfer the source of power for the relay coil from one contact to the other. This circuit, in contradistinction to other cumbersome circuits, may be turned "on" and turned "off" by a two-wire, momentary, remote sensing type of control switch with polarizing, rectifying elements.

(7) A master control of a momentary remote sensing basic two-wire control system utilizing circuit isolating rectifying elements.

(8) A master "off" control of a momentary remote sensing control system utilizing a two-wire control switch with polarizing, rectifying elements by the simple expedient of a momentary, normally closed master "off" switch.

(9) A remote sensing type of two-wire control switch utilizing but one rectifying element, as particularly shown, for example, in Figs. 1, 9 and 10.

While there has been shown and described what are at present considered to be the preferred embodiments of the invention, it will be obvious to those skilled in the art that many modifications and combinations of circuit elements may be made without departing from the true spirit of the invention and the scope of the claims appended hereto.

I claim:

1. An electrical control circuit comprising a high voltage source of A.C. current having a pair of terminals, a plurality of parallel connected momentary switches, polarizing rectifier elements connected to said switches, a plurality of parallel connected single coil relays connected to said switches, polarizing rectifier elements and a resistor connected to each of said relays, said relays having contacts for controlling output devices, said relays also having a single pole-double throw auxiliary contact assembly having three terminals, one of said contact terminals being in a normally open state with another in a normally closed state and having a common terminal therebetween, said control circuits being connected so that one terminal of the power source is connected to a terminal of each control switch and to the normally open contact of said contact assembly with the other terminal of said power source being connected to the normally closed contact of said assembly and to each of said single coil relays through individual resistors, the common terminal of said auxiliary assembly being connected to the individual relay coils through said polarizing rectifier means connected to the relay, said coil thereof also being connected to said momentary switches through polarizing rectifier elements whereby the circuit operates in a manner such that when said controlled switch is momentarily activated to energize said relay, said polarizing rectifier elements associated with both said relay and said switch are placed in a conducting direction during the same half alternating cycle so as to energize said relay and to seal said relay by transferring power from one auxiliary contact to the other and through said resistor, said relay being further adapted to be deenergized upon momentary activation of said control switch causing said relay coil circuit to be short circuited by the polarizing rectifier elements of both said switch and relay being connected in a conducting direction across said coil of said relay without any power being supplied from the A.C. source.

2. An electrical control circuit comprising a high voltage source of A.C. current having a pair of terminals, a plurality of parallel connected momentary switches, polarizing rectifier elements connected to said switches, each one of a plurality of parallel connected single coil relays connected to an individual one of said switches respectively, polarizing rectifier elements and a resistor connected to each of said single coil relays, a master control switch also being connected to said single coil relays, said relays having contacts for controlling output devices, said relays also having a single pole-double throw auxiliary contact assembly having three terminals, one of said contact terminals being in a normally open state with another in a normally closed state and having a common terminal therebetween, said control circuit having one terminal of the power source connected to a terminal of each control switch and to the normally open contact of said contact assembly with the other terminal of said power source being connected to the normally closed contact of said assembly and to each of said single coil relays through individual resistors, the common terminal of said auxiliary assembly being connected to the individual relay coils through said polarizing rectifier means connected to the relays, said coils thereof also being connected to said momentary switches through polarizing rectifier elements whereby the circuit operates in a manner such that when said controlled switch is momentarily activated to energize said relay, said polarizing rectifier elements associated with both said relays and said switches are placed in a conducting direction during the same half alternating cycle so as to energize said relays and to seal said relays by transferring power from one auxiliary contact to the other and through said resistor, said relays being further adapted to be deenergized upon momentary activation of said control switch causing said relay coil circuits to be short circuited by the polarizing rectifier elements of both said switches and relays being connected in a conducting direction across said individual coils of said relays without any power being supplied from the A.C. source.

3. An electrical control system adapted for use in controlling equipment, comprising a plurality of independently controlled circuits, each circuit comprising at least one momentary switch with at least one half-wave, polarizing rectifier connected thereto, at least one polarized bistable relay with contacts adapted to control said equipment, a single conductor connecting said momentary switch-rectifier and said polarized bistable relay, one conductor connecting all of said individual momentary switch-rectifiers to one side of a common alternating current power source and another conductor connecting all of said individual polarized bistable relays to the other side of said common A.C. power source, said momentary switch-rectifiers passing A.C. pulses of one polarity to energize the polarized bistable relays so as to activate the associated equipment, and by directing A.C. pulses of the opposite polarity to energize the polarized bistable relays so as to deactivate the associated equipment, and a master control circuit comprising at least one momentary single-pole double throw master control switch and a plurality of two cell series connected master control rectifiers comprising two end terminals and a mid-terminal, the mid terminal of said master control switch connected to one side of said common A.C. power source, the other end terminals of said master control switch connected to corresponding end terminals of said master control rectifiers, the mid terminal of each master control rectifier being connected to said single conductor connecting the momentary switch-rectifiers and the polarized bistable relay of each independently controlled circuit to be master controlled, said individual independently controlled circuits and the master control circuit being interconnected for master control and isolated for independent control by the conducting and blocking characteristic of the master control rectifiers.

References Cited in the file of this patent

UNITED STATES PATENTS

| | | |
|---|---|---|
| 821,672 | Richards | May 29, 1906 |
| 1,535,360 | Vickery | Apr. 28, 1925 |
| 1,867,212 | Diodati | July 12, 1932 |
| 1,897,749 | Bonanno | Feb. 14, 1933 |
| 2,424,243 | Lowell | July 22, 1947 |
| 2,450,924 | Stilwell | Oct. 12, 1948 |
| 2,632,072 | Zellner | Mar. 17, 1953 |

OTHER REFERENCES

"Low Voltage Control," a manual published by The Square D Company, August 1948.